United States Patent [19]
DeBiasi et al.

[11] Patent Number: 5,481,176
[45] Date of Patent: Jan. 2, 1996

[54] ENHANCED VEHICLE CHARGING SYSTEM

[75] Inventors: Charles J. DeBiasi, Allen Park; Vikas Tuteja, Novi; Zeljko Deljevic, Westland; John F. Renehan, South Lyon, all of Mich.

[73] Assignee: Ford Motor Company, Dearborn, Mich.

[21] Appl. No.: 270,570

[22] Filed: Jul. 5, 1994

[51] Int. Cl.⁶ .................................................. H02J 1/00
[52] U.S. Cl. ................................. 322/7; 322/8; 322/14; 290/40 F
[58] Field of Search ......................... 322/8; 320/64, 320/35; 123/339; 290/40 R

[56] References Cited

U.S. PATENT DOCUMENTS

| | | |
|---|---|---|
| 4,080,059 | 3/1978 | Tani et al. . |
| 4,459,489 | 7/1984 | Kirk et al. . |
| 4,520,272 | 5/1985 | Danno et al. . |
| 4,543,521 | 9/1985 | Morishita et al. ........................ 320/64 |
| 4,608,639 | 8/1986 | Morishita et al. ....................... 364/424 |
| 4,629,968 | 12/1986 | Butts et al. ............................... 322/29 |
| 4,633,093 | 12/1986 | Otobe et al. . |
| 4,636,706 | 1/1987 | Bowman et al. . |
| 4,649,878 | 3/1987 | Otobe et al. . |
| 4,659,977 | 4/1987 | Kissel et al. . |
| 4,670,704 | 6/1987 | Maehara et al. . |
| 4,682,044 | 7/1987 | Hotate et al. . |
| 4,721,082 | 1/1988 | Hibino et al. . |
| 4,794,898 | 1/1989 | Kato . |
| 4,989,565 | 2/1991 | Shimomura et al. . |
| 5,038,728 | 8/1991 | Yoshida et al. . |
| 5,054,446 | 10/1991 | Ohuchi . |
| 5,093,583 | 3/1992 | Mashino et al. . |
| 5,111,788 | 5/1992 | Washino . |
| 5,163,399 | 11/1992 | Bolander et al. ........................ 123/339 |

*Primary Examiner*—Steven L. Stephan
*Assistant Examiner*—Nicholas Ponomarenko
*Attorney, Agent, or Firm*—Mark S. Sparschu; Roger L. May

[57] ABSTRACT

An enhanced charging system for a motor vehicle includes an alternator, a voltage regulator, and an engine controller. The voltage regulator and engine controller are connected by two circuits. One of the circuits provides the engine controller with a measure of the torque about to be applied to the engine by the alternator. The other circuit allows the engine controller to command the target voltage at which the voltage regulator is to control the alternator. The engine controller determines the target voltage based on intake air temperature, a measure of the temperature of the air at the intake of the engine. The engine controller then modifies the target voltage based on (1) whether the throttle of the engine is near wide-open-throttle; (2) whether the brakes of the vehicle are applied; and (3) whether the alternator is about to apply an increased torque to the engine.

13 Claims, 2 Drawing Sheets

ENHANCED VEHICLE CHARGING SYSTEM

BACKGROUND OF THE INVENTION

1. Field of the Invention

The present invention relates to charging systems for motor vehicles.

2. Description of the Related Art

A typical motor vehicle with an internal combustion engine has a battery used predominantly for providing power to crank the engine to start the vehicle. Charging the battery is usually done via an alternator driven by the engine. A voltage regulator is typically mounted to the alternator and controls the output voltage of the alternator to a predetermined value. The voltage regulator contains the bulk of the electronics in a typical charging system.

An alternator generally requires a significant amount of torque from the engine. As a result, the alternator can have a detrimental effect on such engine performance parameters as idle stability and engine power. Further, there are opportunities in the control of an alternator for providing advantages, such as increased energy storage in the vehicle battery while the vehicle is being braked. Conventional charging systems simply were not designed to counteract the detrimental effects on engine performance and take advantage of opportunities available in the control of a vehicle alternator.

U.S. Pat. No. 4,659,977, issued to Kiesel et. al, discloses a charging system in which an alternator is directly connected to an engine controller. Although such a configuration may have advantages over conventional charging systems, optimal electrical system partitioning often precludes such integration. It may be preferable in some instances for a substantial amount of the charging system electronics to remain near the alternator.

As a result, an enhanced charging system with improved ability to control the alternator and which allows a substantial amount of the charging system electronics to remain near the alternator will provide advantages over the prior art.

SUMMARY OF THE INVENTION

The present invention provides a charging system for a motor vehicle having an engine with an air intake and a throttle, the motor vehicle further having brakes and a battery. The invention comprises an alternator for generating electrical energy. The invention further includes a voltage regulator adapted to control an output voltage of the alternator, the voltage regulator having a first input adapted to receive a signal representing a desired voltage level and a first output adapted to provide a signal representing a mechanical load of the alternator on the engine. Additionally, the invention includes an engine controller adapted to control an idle speed of the engine, the engine controller further comprising a second input adapted to read the signal generated by the first output and a second output adapted to provide the signal received by the first input. According to the invention, the first output is coupled to the second input and the second output is coupled to the first input.

The present invention allows enhanced control of the charging system of a motor vehicle and allows a substantial amount of the electronics of the charging system to remain near the alternator of the vehicle.

DETAILED DESCRIPTION OF THE PREFERRED EMBODIMENT

Figure 1:
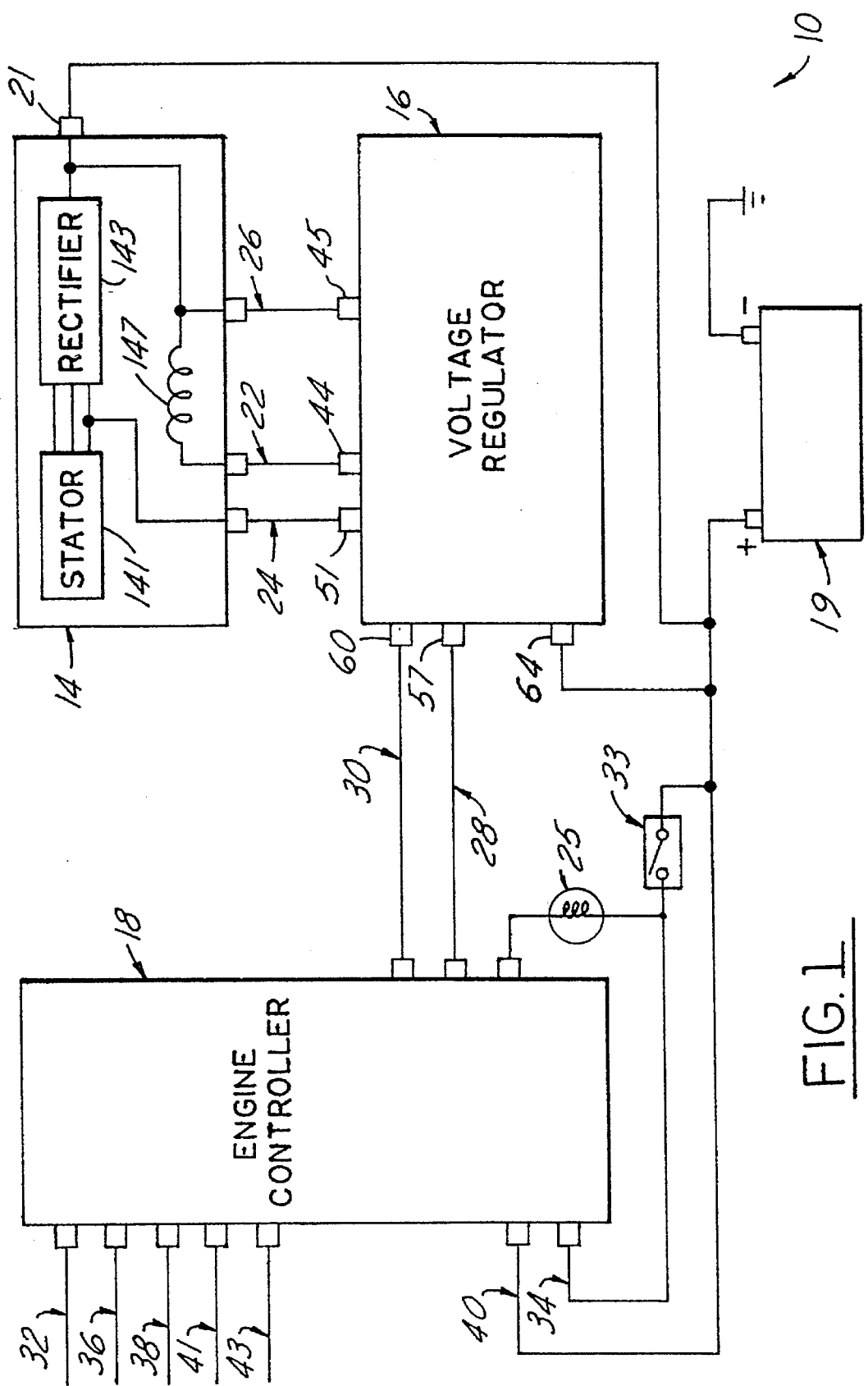
FIG. 1 illustrates a charging system 10 according to one embodiment of the present invention.

Referring to FIG. 1, a charging system 10 according to one embodiment of the present invention is illustrated. Alternator 14 is a device which generates electrical energy on a motor vehicle. Alternator 14 is coupled to the vehicle's engine (not shown) to rotate along with engine rotation. Connected to alternator 14 is voltage regulator 16. Regulator 16 is responsible for trying to keep the output voltage of alternator 14 in regulation. Battery 19 is charged by current received from output 21 of alternator 14.

Regulator 16 and alternator 14 are physically coupled such that they form one unit which is installed on the engine when the engine is assembled.

Alternator 14 comprises a three-phase stator 141, as is contained in alternators known to the art. Stator 141 has three windings, the outputs of which are connected to rectifier 143. Rectifier 143 takes the three-phase alternating current power output from stator 141 and converts the power to direct current power for use by the motor vehicle. Rectifier 143 is a six-diode rectifier bridge, well-known to those skilled in the art.

The output of rectifier 143 goes to output terminal 21 of alternator 14. Further, the output of rectifier 143 goes to field coil 147.

Engine controller 18 is preferably an EEC-IV controller from Ford Motor Company, although other controllers can be substituted. Engine controller 18 is preferably a microprocessor-based device which contains sufficient microcomputer resources (memory, throughput, registers, inputs, outputs and the like) to perform the functions ascribed to it herein. Engine controller 18 has responsibility for a number of engine management functions including idle control, as are many engine controllers known to the art. In the present invention, engine controller 18 further has responsibility for determining the voltage to which regulator 16 should control the output of alternator 14.

Connecting regulator 16 and alternator 14 are three circuits. Field circuit 22 is the means by which regulator 16 controls the voltage output from alternator 14. Regulator 16 modulates the voltage on field circuit 22 to control field current in field coil 147 of alternator 14. Stator circuit 24 is a means by which regulator 16 verifies proper operation of alternator 14. Through stator circuit 24, regulator 16 can monitor whether alternator 14 is producing a voltage output. B+ circuit 26 is the third signal connecting alternator 14 to regulator 16.

Connecting regulator 16 and engine controller 18 are two circuits. Load indicator circuit 28 provides a pulse-width-modulated signal from regulator 16 to engine controller 18. The duty cycle of that signal is proportional to the duty cycle of the voltage at circuit 22 (i.e., the circuit which sinks current through field coil 147). The signal on load indicator circuit 28 provides engine controller 18 with a measure of the mechanical torque applied to the engine by alternator 14. It will be recognized by those skilled in the art that the torque applied to the engine by alternator 14 is a function of the current flowing though field coil 147.

Load indicator circuit 28 has a second function as well. If voltage regulator 16 detects a fault in the charging system, voltage regulator 16 pulls load indicator circuit 28 LOW continuously. This indicates to engine controller 18 that a fault has occurred in the charging system.

Regulator control circuit 30 is a means by which engine controller 18 can provide a command to regulator 16 indicating the output voltage level at which regulator 16 should control alternator 14. The signal provided by engine controller 18 to regulator 16 on regulator control circuit 30 is pulse-width-modulated, the duty cycle of the signal being a function of the desired output voltage command from engine controller 18 to regulator 16. Preferably, the duty cycle of the signal is generally proportional to the desired output voltage command from engine controller 18 to regulator 16.

Charging system warning lamp 25 is connected between ignition switch 33 and engine controller 18. Engine controller 18 illuminates warning lamp 25 in the event that engine controller 18 learns from voltage regulator 16 via load indicator circuit 28 that a fault has occurred in the charging system. The vehicle's driver is thus informed of the malfunction in his charging system.

Inputs to engine controller 10 include PIP 32, a signal which is a pulse train with a frequency proportional to the rotational speed of the engine. IGN 34 is a signal with a high level (e.g., about 12 volts) when ignition switch 33 in the vehicle is ON. ECT 36 is an analog signal representing the temperature of the coolant in the engine. IAT 38 is an analog signal representing the temperature of air entering the intake manifold of the engine. VBATT 40 is a direct connection to vehicle battery. TPS 41 is an analog signal representing the extent to which the throttle of the engine is open. BOO 43 is a signal which represents whether the brakes of the vehicle are applied. PIP 32, IGN 34, ECT 36, IAT 38, VBATT 40, TPS 41 and BOO 43 are all signals generally available to engine controllers existing in the art.

Figure 2:
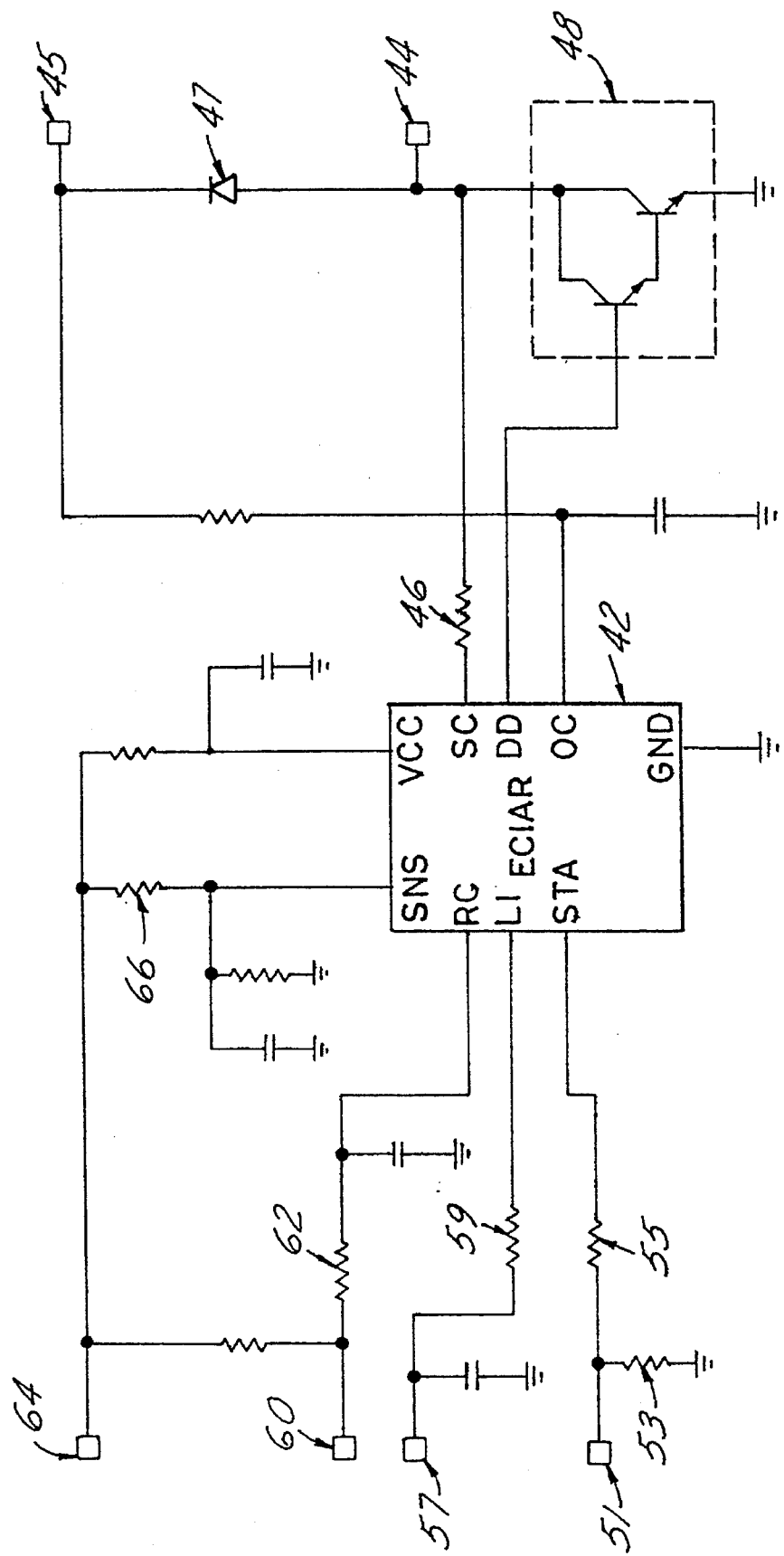
FIG. 2 illustrates voltage regulator 16 of charging system 10 of FIG. 1.

The interior of regulator 16 will now be described with additional reference to FIG. 2. Regulator 16 includes integrated circuit (IC) 42. IC 42 is known as an "Externally-Controlled Integral Alternator Regulator" (ECIAR) chip and is manufactured by Motorola.

Field terminal 44 is connected to the collector of Darlington transistor 48. Darlington transistor 48 is the means by which current is modulated in the field coil of alternator 14 for control of the output voltage of alternator 14. The base of Darlington transistor 48 is connected to pin "DD" of IC 42. Pin "DD" turns Darlington transistor 48 ON and OFF.

Field terminal 44 is further connected through resistor 46 to pin "SC" of IC 42. This connection is the means by which a short circuit to system voltage (i.e., nominally 12 volts) across field coil 147 is detected by regulator 16. If such a short circuit occurs and system voltage appears at field terminal 44, an abnormally large current will flow when Darlington transistor 48 turns on. To prevent such a large current when a short circuit occurs, pin "SC" of IC 42 monitors the voltage at field terminal 44. If the voltage does not quickly drop when pin "DD" turns on Darlington transistor 48, a short circuit fault is detected. IC 42 will then immediately turn off Darlington transistor 48 and take other appropriate action, such as periodically trying again to turn on Darlington transistor 48.

Regulator 16 contains recirculation diode 47. By examination of FIGS. 1 and 2, it is apparent that recirculation diode 47 is connected across field coil 147. The purpose of recirculation diode 47, as is known in the art, is to clamp the voltage across field coil 147 as field coil 147 is turned ON and OFF by regulator 16. Clamping of the voltage by recirculation diode 47 prevents large swings in field current as field coil 147 is turned ON and OFF. Recirculation diode 47 is also called a "flyback diode" by some people in the art.

Stator terminal 51 of regulator 16 is connected to ground via resistor 53 and to pin "STA" of IC 42 via resistor 55. As has been previously mentioned, stator terminal 51 is connected to one winding of the stator of alternator 14. Unless an alternating voltage (characteristic of the output of one phase of three-phase alternator 14) is seen at pin "STA", a fault is indicated.

Load indicator terminal 57 of regulator 16 is connected via resistor 59 to pin "LI" of IC 42. Pin "LI" has the ability to sink current, thereby being able to pull load indicator terminal 57 LOW. In this way, pin "LI" can create a pulse-width-modulated load-indicating signal at load indicator terminal 57, which is read by engine controller 18. The signal at pin "LI" is essentially contemporaneous with the signal at pin "DD", which drives field coil 147 via Darlington transistor 48 as discussed above. Pin "LI" also has the ability, previously discussed, to hold load indicator terminal 57 LOW continuously. In this way, regulator 16 indicates to engine controller 18 that a charging system fault has been detected by regulator 16.

Terminal 60 of regulator 16 is connected via resistor 62 to pin "RC" of IC 42. As has been previously mentioned, terminal 60 is an input to regulator 16 for the voltage command from engine controller 18 on circuit 30. The signal fed via terminal 60 to pin "RC" is also used to "wake up" IC 42. IC 42 goes into a quiescent state when the vehicle is not being operated and the charging system is not needed. IC 42 "wakes up" when it sees the pulse width modulated signal provided from engine controller 18 on circuit 30.

Terminal 64 of regulator 16 is connected via resistor 66 to pin "SNS" of IC 42. Terminal 64 is connected to battery 19, in order for regulator 16 to sense the voltage of battery 19. Terminal 64 is also connected to pin "VCC" of IC 42, to supply power to IC 42.

Pin "OC" of IC 42 monitors the voltage at terminal 45 of regulator 16. As is apparent by examining FIGS. 1 and 2, this voltage being monitored is the output voltage from alternator 14. The voltage is monitored at pin "OC" in order to detect whether an open circuit exists at the output terminal 21 of alternator 14. If such an open circuit exists, the output voltage of alternator 14 generally rises due to the lack of an electrical load on output terminal 21. Via pin "OC", IC 42 compares the output voltage to a predetermined value (typically about 20 volts). IC 42 limits the duty cycle of Darlington transistor 48 as necessary to prevent the output voltage from exceeding the predetermined value.

One skilled in the art will also recognize that a microprocessor can be substituted for IC 42 within regulator 16. Such a microprocessor can be programmed with software and provided with appropriate microcomputer resources (inputs, outputs, registers, memory and the like) to perform the functions of IC 42.

The operation of charging system 10 will now be described with reference to FIG. 1. Engine controller 18 determines a "base" voltage command to be sent to regulator 16. That "base" voltage command is gathered from a look-up table, whose independent variable is intake air temperature, provided to engine controller 18 as signal IAT 38. Those skilled in the art will recognize that the preferable voltage at which to charge a battery is dependent on the temperature of the battery. Intake air temperature is used as an approximation of the temperature of battery 19. Of course, other means for sensing battery temperature, including a sensor within battery 19, can also be employed.

Once the "base" voltage command has been determined, a number of variations to that voltage command can be applied. First, it is determined whether the throttle is near wide open throttle. If so, engine controller 18 decreases the "base" voltage command, preferably by subtracting a constant from the "base" voltage command. Such a decrease reduces the torque on the engine from alternator 14, to allow the engine more torque with which to respond to the near-wide-open-throttle command.

Another variation to the "base" voltage command occurs if the brakes of the vehicle are applied. Here, the "base" voltage command to alternator 14 is increased, preferably by adding a constant to the "base" voltage command. Such an increase allows battery 19 to capture more energy than it otherwise would. Although the increase in voltage command causes more torque on the engine from alternator 14, that increased torque is of no consequence because the driver is trying to slow or stop the vehicle anyway. The increase in voltage command causes less energy to be dissipated in the brakes of the vehicle and more to be stored in battery 19, from where it can be recovered.

Another variation to the base voltage command occurs if the engine is at idle. If the engine is at idle, an increased load on the engine from alternator 14 can cause the idle speed to sag. Such an increased load would come from electrical loads being turned on in the vehicle. Engine controller 18 monitors load-indicator circuit 28 to be aware of the load which will be placed on the engine by alternator 14. A key fact to realize is that the duty cycle of the voltage on circuit 22 will increase before the torque of the alternator increases. As a result, by monitoring circuit 28 (which has a duty cycle proportional to the duty cycle of the voltage on circuit 22), engine controller 18 can know in advance when an increased load will be placed on the engine by alternator 14.

The duty cycle of the voltage on circuit 22 increases before the torque of alternator 14 increases for at least two reasons. First, there is a delay between a change in the voltage at circuit 22 and a corresponding change in the field current in field coil 147. Second, there is a delay between a change in field current in field coil 147 and a corresponding change in the torque of alternator 14. The sum of the two delays can typically total several hundred milliseconds.

When engine controller 18 recognizes through monitoring load-indicator circuit 28 that an increased load is about to occur, engine controller 18 decreases the voltage command in a step decrease. Engine controller 18 then slowly ramps the voltage command back up, in such a manner that engine controller 18's idle control algorithm can maintain a stable idle, substantially unaffected by the increased load from alternator 14.

Once engine controller 18 has determined a "base" voltage command and has altered that command based on any or all of (1) throttle opening, (2) application of vehicle brakes, and (3) increased torque of the alternator, engine controller 18 generates a pulse-width modulated signal on circuit 30. This signal indicates to regulator 16 the voltage at which it is to control the output from alternator 14.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A charging system for a motor vehicle having an engine with an air intake and a throttle, said motor vehicle further having brakes and a battery, said charging system comprising:
   (a) an alternator for generating electrical energy including an output voltage;
   (b) a voltage regulator adapted to control said output voltage of said alternator, said voltage regulator having a first input adapted to receive a signal representing a desired output voltage of said alternator and a first output adapted to provide a signal representing a mechanical load of said alternator on said engine; and
   (c) an engine controller adapted to control an idle speed of said engine, said engine controller further comprising a second input adapted to receive said signal provided by said first output and a second output adapted to provide said signal received by said first input;
   wherein said first output is coupled to said second input and said second output is coupled to said first input.

2. A charging system as recited in claim 1, wherein:
   said alternator has a field coil;
   said regulator further has a third output adapted to drive said field coil of said alternator, said third output coupled to said field coil; and
   said signal representing a mechanical load of said alternator on said engine provides an indication of a voltage at said third output.

3. A charging system as recited in claim 2, wherein said engine controller further comprises means for modifying said desired output voltage of said alternator based on a temperature signal indicating or approximating a temperature of said battery.

4. A charging system as recited in claim 3, wherein said temperature signal indicates an intake air temperature of said engine.

5. A charging system as recited in claim 3, wherein said temperature signal is generated by a sensor located within said battery.

6. A charging system as recited in claim 2, wherein said engine controller further comprises means for modifying said desired output voltage of said alternator based on an extent to which a throttle of said engine is open.

7. A charging system as recited in claim 2, wherein said engine controller further comprises means for modifying said desired output voltage of said alternator based on whether brakes of said vehicle are applied.

8. A charging system as recited in claim 2, wherein said engine controller further comprises means for modifying said desired output voltage of said alternator based on said signal representing a mechanical load of said alternator on said engine.

9. A charging system as recited in claim 8, wherein said signal representing a mechanical load of said alternator on said engine is pulse-width modulated.

10. A charging system as recited in claim 9, wherein said signal representing a desired output voltage of said alternator is pulse-width modulated.

11. A charging system as recited in claim 10, wherein said means for modifying said desired output voltage of said alternator based on said signal representing a mechanical load of said alternator on said engine further comprises:
    (a) means for reducing said desired output voltage of said alternator from an initial value if said signal representing a mechanical load of said alternator on said engine indicates an increased load relative to a previous indication; and (b) means for returning said desired output voltage of said alternator back to substantially said initial value after said desired output voltage of said alternator has been reduced by said reducing means.

12. A charging system as recited in claim 2, wherein said first output is further adapted to provide a signal indicating a fault in said charging system and said second input is further adapted to receive said signal indicating a fault in said charging system.

13. A charging system for a motor vehicle having an engine with an air intake and a throttle, said motor vehicle further having brakes and a battery, said charging system comprising:

(a) an alternator for generating electrical energy including an output voltage;

(b) a voltage regulator adapted to control said output voltage of said alternator, said voltage regulator having a first input adapted to receive a signal representing a desired output voltage of said alternator and a first output adapted to provide a signal representing a mechanical load of said alternator on said engine; and (c) an engine controller adapted to control an idle speed of said engine, said engine controller further comprising a second input adapted to read said signal generated by said first output and a second output adapted to provide said signal received by said first input;

wherein said first output is coupled to said second input and said second output is coupled to said first input;

wherein said regulator further has a third output adapted to drive a field coil of said alternator, said third output coupled to said field coil;

wherein said signal representing a mechanical load of said alternator on said engine provides an indication of a voltage at said third output;

wherein said first output is further adapted to provide a signal indicating a fault in said charging system and said second input is further adapted to receive said signal indicating a fault in said charging system;

wherein said engine controller further comprises means for modifying said desired output voltage of said alternator based on a temperature of air at an intake of said engine;

wherein said engine controller further comprises means for modifying said desired output voltage of said alternator based on an extent to which a throttle of said engine is open;

wherein said engine controller further comprises means for modifying said desired output voltage of said alternator based on whether brakes of said vehicle are applied; and wherein said engine controller further comprises means for modifying said desired output voltage of said alternator based on said signal representing a mechanical load of said alternator on said engine.

\* \* \* \* \*